July 21, 1942.    G. GILLIVER ET AL    2,290,233
REMOTE CONTROL SYSTEM
Filed June 5, 1940    3 Sheets-Sheet 1
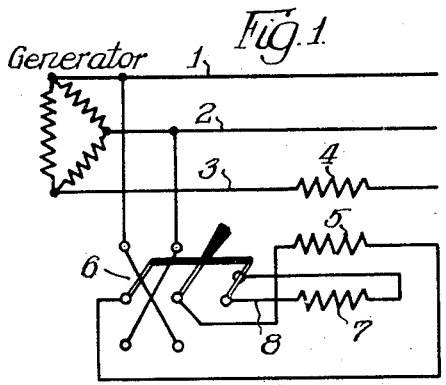
Phase reversing switch for controlling street lights at remote point.
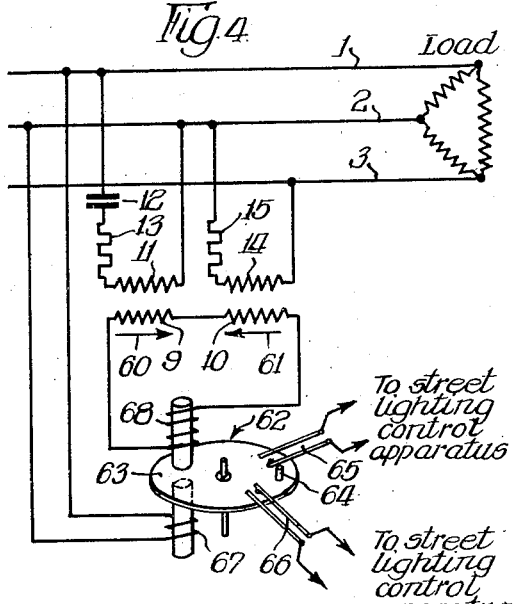
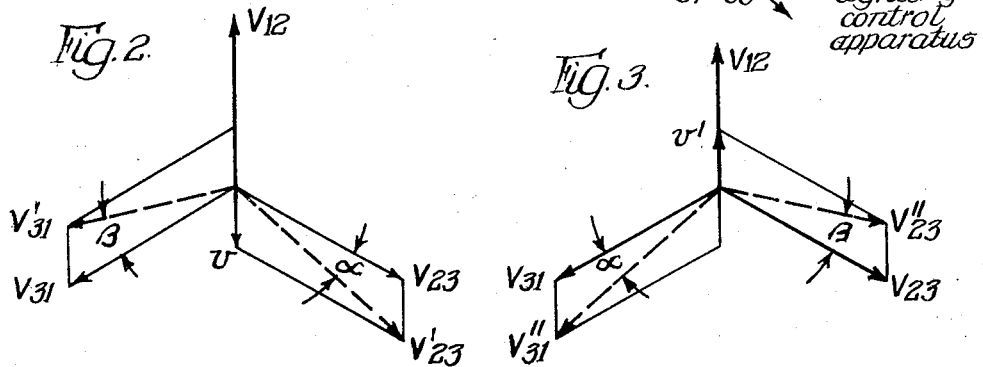
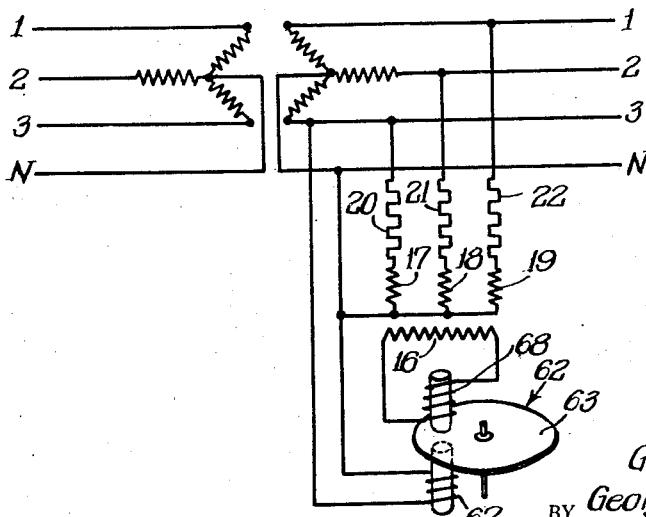
Inventors:
Gilbert Gilliver,
George Frank Tagg,
George Frederick Shotter, July 21, 1942.  G. GILLIVER ET AL  2,290,233

REMOTE CONTROL SYSTEM

Filed June 5, 1940  3 Sheets-Sheet 2

Inventors:
Gilbert Gilliver,
George Frank Tagg,
BY George Frederick Shotter,

July 21, 1942.    G. GILLIVER ET AL    2,290,233
REMOTE CONTROL SYSTEM
Filed June 5, 1940    3 Sheets-Sheet 3

Inventors:
Gilbert Gilliver,
George Frank Tagg,
BY George Frederick Shotter,

Patented July 21, 1942

2,290,233

UNITED STATES PATENT OFFICE 2,290,233

REMOTE CONTROL SYSTEM

Gilbert Gilliver and George Frank Tagg, Enfield, and George Frederick Shotter, Friern Barnet, London, England, assignors to Sangamo Electric Company, Springfield, Ill.

Application June 5, 1940, Serial No. 338,940
In Great Britain June 15, 1939

7 Claims. (Cl. 171—97)

This invention concerns improvements relating to electrical remote-control or signalling systems of the kind in which the remote control is exercised or the signals are transmitted over the lines of a three-phase supply system. It is an object of the invention to provide an improved arrangement by which the three-phase lines, particularly high-tension lines, can be utilised without the use of pilot wires and with a minimum disturbance of the system for remote-control or signalling purposes. The invention is particularly intended for the remote control of street lighting, but is applicable also to other purposes, such as the control of tariff-changing operations.

It has already been proposed that remote control should be exercised over a three-phase system by producing a variation of phase angle of one of the three line voltages in relation to the other two by the application of an auxiliary transformer with the effect of generating on one of the three phases an auxiliary voltage at 90° to the voltage of that phase.

According to the present invention, in a remote-control or signalling system of the kind set forth, variations of phase angle and magnitude of two of the line voltages of the system in relation to the third are produced for remote control or signalling purposes by an auxiliary transformer which generates an auxiliary voltage at an appropriate angle to one of the two line voltages and at another appropriate angle to the other of the said voltages.

These variations may be produced at a point on the high-tension side of the system and, when so produced, can be received at another point on the same side or at a point on the low-tension side.

When the signals are transmitted at a point on a four-wire system the resulting variation in magnitude of the line voltages will give rise to a current in the fourth or neutral wire and a receiving arrangement or relay adapted for operation by said current may be provided.

When, however, the variations are produced at a point on a three wire system there is no such current for operating a relay and a receiving arrangement adapted for operation solely by the variation of phase angle of the line voltage is employed.

It is usual to employ four-wire low tension systems fed from three-wire high tension systems through delta-star transformers.

If the variations are produced at a point on the three wire high tension system and received at a point on the four-wire low tension system a receiving arrangement or relay adapted for operation by variations in phase angle must be employed.

One method of utilising this phase disturbance to operate a relay is, according to these improvements, to connect the voltage coil of a relay across the affected lines and the series coil of said relay between the remaining line and neutral, so that the flux due to the pressure coil alters in phase relatively to the flux due to the series coil upon receipt of a signal.

Another method of utilising the phase disturbance for operating a relay is to connect the coil of the relay in a balanced circuit associated with the affected lines, said circuit including resistance, capacitance and inductance so chosen that under normal conditions no current flows in the coil whereas when a phase disturbance is produced by signalling, the balance of the circuit is upset and a current flows in the coil producing a flux adapted for closing contacts.

In order that the invention may be readily understood reference is directed to the accompanying drawings wherein—

Figure 1 is a diagram of a transmitting arrangement in accordance with one embodiment of the invention.

Figures 2 and 3 are vector diagrams of line voltages showing variations produced by transmitting arrangements according to this invention.

Figure 4 is a diagram of a receiving arrangement in accordance with the invention.

Figures 5 and 6 are circuit diagrams of modified receiving arrangements.

Figure 6:
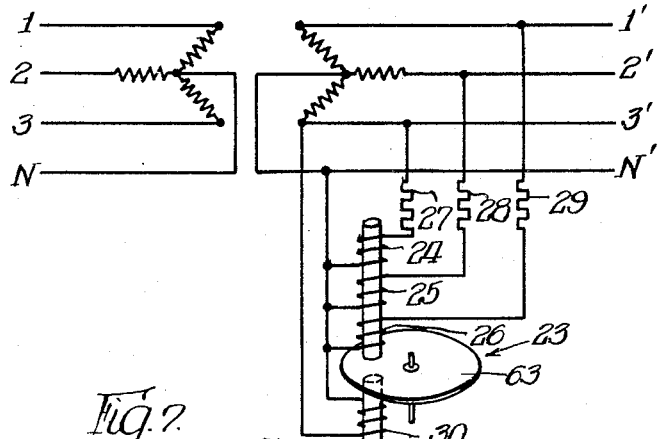

Referring to Figure 1 the secondary winding 4 of a transformer is included in the line 3 of a three-phase distribution system comprising wires 1, 2 and 3. The primary winding 5 of the transformer can be connected, by means of a reversing switch 6, in either direction across the lines 1 and 2. A third winding 7 of the transformer is normally short circuited by a switch 8.

Consequently, under normal circumstances, the transformer acts as a short-circuited current transformer and merely introduces a negligible impedance into the line 3.

To transmit a signal, the short-circuiting switch 8 is opened and the reversing switch 6 is closed on one side or the other. If desired, the switches 6 and 8 may be mechanically or electromagnetically coupled together for this operation, as shown. By this means, a voltage is introduced into the line 3 in phase with or opposition to the voltage across the lines 1 and 2.

In Figure 2 the normal voltages across the lines are represented by the vectors $V_{12}$, $V_{31}$ and $V_{23}$. For one direction of closure of the switch 6 the voltage introduced into line 3 is represented by the vector $v$ in opposition to the voltage $V_{12}$. The voltage $v$ affects the voltages $V_{31}$ and $V_{23}$, it being added vectorially to voltage $V_{23}$ producing a resulting $$V^1_{23}$$

and subtracted vectorially from voltage $V_{31}$ producing a resultant $$V^1_{31}$$

Thus the voltage $V_{23}$ is retarded in phase through an angle $\alpha$ and increased in magnitude while the voltage $V_{31}$ is also retarded in phase (through angle $\beta$) but reduced in magnitude.

For the other direction of closure of the switch 6, the opposite effect is produced as shown in Figure 3. The voltage $v^1$ introduced into line 3 is in phase with voltage $V_{12}$ resulting in a reduced voltage $$V^{11}_{23}$$

advanced through an angle $\beta$ and an increased voltage $$V^{11}_{31}$$

advanced through an angle $\alpha$.

With the introduced voltage $v$ or $v^1$ at 60° or 120° to the affected line voltages, the angles $\alpha$ and $\beta$ and the increases and decreases in magnitude are nearly equal. With other feasible angles, one line voltage is affected more seriously than the other and greater disturbance of the system results.

A receiving arrangement more particularly for use on a high tension system is shown in Figure 4 and comprises two transformers having their secondaries 9 and 10 connected in opposition as indicated by the arrows 60 and 61. The primary 11 of one transformer is connected, in series with a condenser 12 and resistance 13, across the lines 1 and 2 between which the voltage $V_{12}$ is not affected. The primary 14 of the other transformer is connected, in series with a resistance 15, across one of the pairs of lines whose voltage is affected as described above, say across lines 2 and 3 as shown.

Without the condenser 12, the current in the transformer 9, 11 would normally lead that in transformer 10, 14 by 120°. By making the condenser 12 of appropriate capacity this lead may be increased to 180°. The voltages across the secondaries 9 and 10 are then normally in phase opposition, as indicated, and no voltage appears across the extreme terminals of the secondaries 9 and 10.

As soon as a signal is transmitted, the angle between the line voltages $V_{13}$ and $V_{23}$ become changed from 120° to 120°+$\alpha$ or 120°−$\beta$ according to the direction of closure of the switch 6 of the transmitting arrangement. The voltages across the secondaries 9 and 10 no longer balance and a voltage appears across the extreme terminals thereof which can be utilised for actuating a relay or other receiving means. This voltage is of opposite phase according to the direction of closure of the switch 6 and, consequently, it can be employed to operate an A. C. relay, shown generally at 62, which closes one or other of two contacts depending upon the phase.

The relay 62 may be of the wattmeter type and include a disc 63 normally located in the position shown. The disc 63 carries a pin 64 that is arranged to cooperate with sets of contacts 65 and 66 for closing one set or the other depending upon the direction of rotation of the disc 63. A coil 67 connected for energization between lines 1 and 2 cooperates with coil 68 energized from secondaries 9 and 10 in a well known manner to rotate the disc 63 in one direction or the other in accordance with the phase of the applied control voltage.

Receiving arrangements for use, more particularly on the low-tension side of a three phase supply system will now be described.

Figure 5 shows such an arrangement which depends for its operation on a variation in the sum of the line voltages and is therefore suitable only when the signals are transmitted entirely over a 4-wire three phase system. The arrangement comprises a transformer with a single secondary 16 and three primaries 17, 18 and 19 connected in series with respective resistances 20, 21 and 22, in star between the lines 1, 2 and 3 and the neutral N. Normally there is no flux in the core of this transformer and no voltage is induced in the secondary 16. However, when a signal is transmitted, the line voltages $V_{12}$, $V_{31}$ and $V_{23}$ become unbalanced and a voltage is induced in the secondary 16 whose phase depends on the direction of closure of the switch 6 of the transmitting arrangement. This voltage can be utilised to operate an A. C. relay, such as the relay 62, as set forth above.

The transformer comprising the windings 16, 17, 18 and 19 may be dispensed with if use is made of a three phase relay which consists of a watt-hour meter provided with contacts closable by rotation of its disc. There may be separate contacts closable by rotation in each of the two directions. As shown in Figure 6, the voltage coil of a watt-hour meter 23, similar to the relay 62 previously described, is wound in three equal sections 24, 25 and 26 each connected, in series with an appropriate resistance 27, 28 and 29 between lines 1, 2 and 3 respectively and neutral N. The series coil 30 is connected between one line, preferably the line 3 into which the auxiliary voltage is introduced, and neutral N. Normally, when no signal is being transmitted, the flux in the magnet of the voltage coils 24, 25 and 26 is zero and there is no torque on the disc of the meter 23. When a signal is received, the out of balance current in the said coils 24, 25 and 26 produces a flux in the magnet and a torque on the disc. The direction of rotation of the disc will depend upon the phase of the voltage introduced.

It is usual to employ distribution systems comprising 4-wire three phase low tension systems fed from 3-wire three phase high tension systems.

As hereinbefore stated if an auxiliary voltage is introduced into one of the lines of a 3-wire high tension system in accordance with these improvements no variation can be produced in the sum of the line voltages and therefore no variation can be transmitted to the low tension system even though the latter may itself be 4-wire.

The receiving arrangements hereinafter described are particularly adapted for receiving, at a point on a 4-wire low tension system, signals transmitted in accordance with the invention at a point on a 3-wire high tension system from which the low tension system is fed by way of delta-star transformers.

Figure 7:
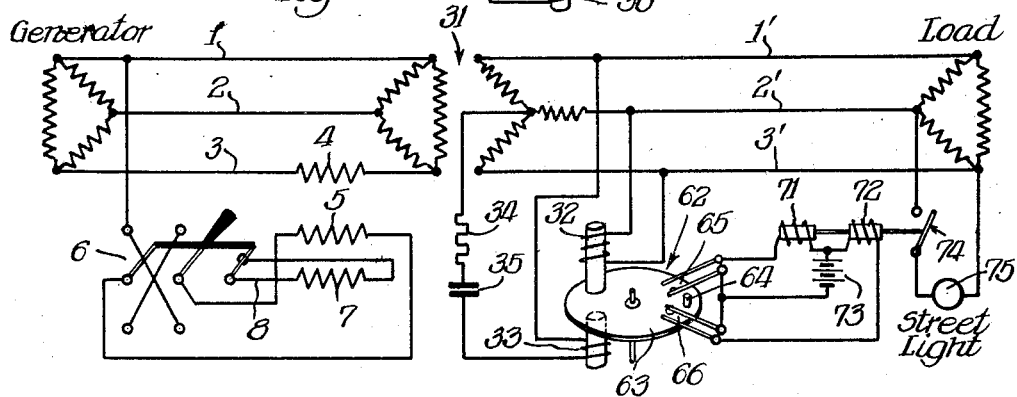
Figure 7 is a circuit diagram of transmitting and receiving arrangements in accordance with the invention, the transmitting arrangement being at a point on a three-wire system and the receiving arrangement at a point on a 4-wire system fed from the 3-wire system.
Figure 8:
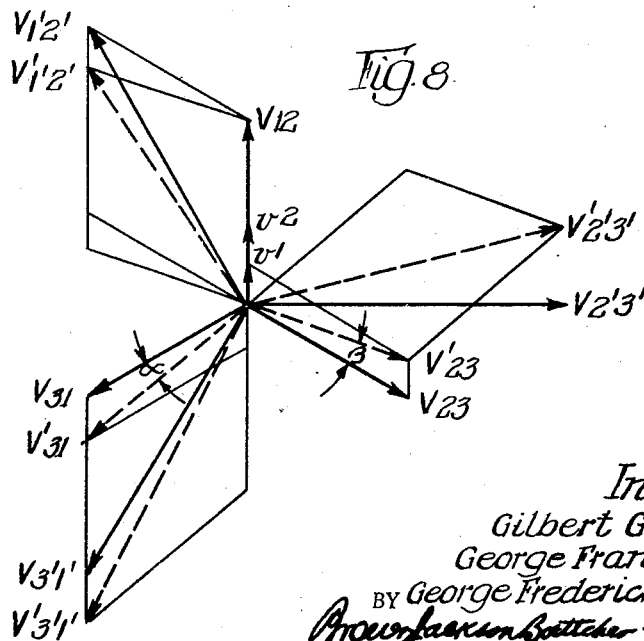
Figure 8 is a vector diagram of the line voltages in Figure 7.

In Figure 7 a transmitting arrangement as described with reference to Figure 1 is shown connected to a point on the lines 1, 2 and 3 of a 3-wire high tension system feeding the lines $1^1$, $2^1$ and $3^1$ of a 4-wire low tension system through a delta-star transformer 31. Referring to the vector diagram (Figure 8) the normal high tension line voltages are represented by the vectors in full lines $V_{12}$, $V_{31}$ and $V_{23}$. The effect of opening the switch 8 and closing the switch 6 (Figure 7) in one direction is to introduce an auxiliary voltage $v^1$ and to advance the vectors $V_{31}$ and $V_{23}$ through angles $\alpha$ and $\beta$ respectively as described with reference to Figure 3. The normal low tension line voltages are represented by the full line vectors $V_1{}^1{}_2{}^1$, $V_3{}^1{}_1{}^1$ and $V_2{}^1{}_3{}^1$. The phase displacement through angles $\alpha$ and $\beta$ of the vectors $V_{31}$ and $V_{23}$ disturbs the phase relationship of all the low tension lines voltages, resulting in voltages $$V^1_{1_21}, \quad V^1_{3^11^1}, \quad V^1_{2^13^1}$$

The two former are only slightly disturbed but, as can be seen from the diagram, the voltage $$V^1_{2^13^1}$$

is the result of a serious disturbance in phase, in fact a quadrature component $v^2$ equal to twice the injected voltage $v^1$ (referred to the low tension system) is introduced into the voltage $V_2{}^1{}_3{}^1$.

The effect of closing the switch 6 in the other direction is to retard the phase of vectors $V_{31}$ and $V_{23}$ through angles $\beta$ and $\alpha$ respectively as described with reference to Figure 2 and although not illustrated it will be understood that the effect on the low tension system is to introduce a quadrature component into the voltage $V_2{}^1{}_3{}^1$ of equal magnitude to the voltage $v^2$ but of opposite phase.

This considerable disturbance of the phase of voltage $V_2{}^1{}_3{}^1$ may be utilised to operate a receiving arrangement such as is shown on the right hand or low tension side of Figure 7, in which the voltage coil 32 of a relay 62, described hereinbefore, is connected across the affected lines (lines $2^1$ and $3^1$) and the series coil 33 of said relay is connected, in series with a suitable resistance 34 and resonated by a condenser 35, between line $1^1$ and neutral N the voltage across which is in phase with $V_{12}$ and as shown in the vector diagram (Figure 8) is normally in quadrature with voltage $V_2{}^1{}_3{}^1$ applied across the voltage coil 32. The coils 32 and 33 may be the voltage and current coils respectively of a watt-hour meter provided with two pairs of contacts 65 and 66 closable by rotation of its disc 63 in either of the two directions. The contacts 65 and 66 can be arranged to respectively energize coils 71 and 72 from a battery 73 for controlling the closing and opening of a switch 74. As shown, the switch 74 can be used for turning on and off a street light 75. The current in the series coil 33 and thus the series coil flux is in phase with the voltage $V_{12}$ and by means of the power factor adjustment on the meter the voltage coil flux can be made 90° out of phase with the voltage $V_2{}^1{}_3{}^1$ and so in phase with the series coil flux. There is, thus, normally no torque on the meter disc. When a signal is transmitted by introducing the auxiliary voltage $v^1$ in high tension line 3 the phase of voltage $V_{12}$ and thus the series coil flux remains undisturbed but as hereinbefore described a quadrature component $v^2$ is introduced into the voltage $V_2{}^1{}_3{}^1$ which produces a torque on the meter disc and closes one pair of the said contacts. When an auxiliary voltage of opposite phase to the voltage $v^1$ is introduced into high tension line 3 the meter disc turns in the opposite direction and closes the other pair of contacts as will be understood.

Figure 9:
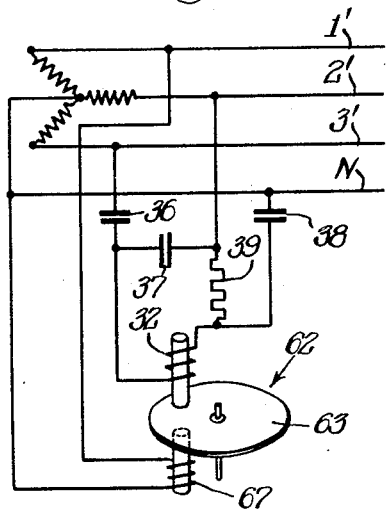
Figures 9–12 are circuit diagrams of modifications of the receiving arrangement shown in Figure 7.

According to the modification illustrated in Figure 9 the voltage coil 32 of a relay or watt hour meter, 62 described hereinbefore, is included in a balanced circuit associated with the affected lines $2^1$ and $3^1$ in such manner that no current flows in the coil 32 except under the disturbed phase conditions resulting from the transmission of a signal. The said circuit comprises two condensers 36 and 37 connected in series across the lines $2^1$ and $3^1$, the voltage coil 32 being connected at one end to the junction between said condensers 36 and 37 and at its other end to a point between a condenser 38 and resistance 39 connected in series between line $2^1$ and neutral N. By suitably choosing the values of the condensers 36, 37 and 38 and the resistance 39, the voltage at each end of the voltage coil 32 can be equalised under normal conditions so that no current flows through the coil 32. A phase disturbance, will, however, upset the balance of the circuit so that a current will flow through the coil 32. The coil 32 cooperating with a coil 67 of the relay 62 will then move the disc 63 in a direction according to the character of the phase disturbance.

Figure 10:
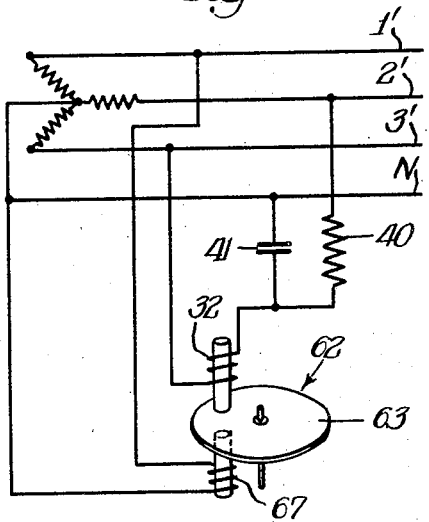

In another form of circuit shown in Figure 10 for achieving the same result an inductive resistance 40 and a condenser 41 are connected in series between one of the affected lines say line $2^1$ and neutral, the condenser 41 being connected to neutral. The voltage coil 32 of the relay 62 is then connected from the junction between the inductive resistance 40 and the condenser 41 to the other one ($3^1$) of the affected lines. The values of the inductive resistance 40 and the condenser 41 are chosen such that the voltage at their junction is under normal conditions equal to that of the line $3^1$ to which the voltage coil 32 is connected. The coil 67 of the relay 62 is connected as shown and cooperates with the coil 32 to rotate the disc 63 as previously described.

Figure 11:
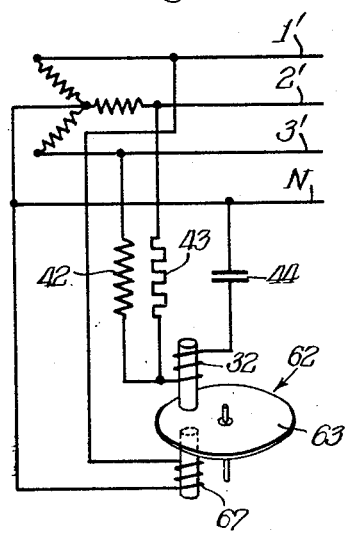

A slightly different arrangement shown in Figure 11 comprises an inductive resistance 42 and a resistance 43 in series across the affected lines $2^1$, $3^1$, the voltage coil 32 of the relay 62, resonated by a condenser 44 being connected from the junction between said inductive resistance 42 and resistance 43 to neutral N.

Figure 12:
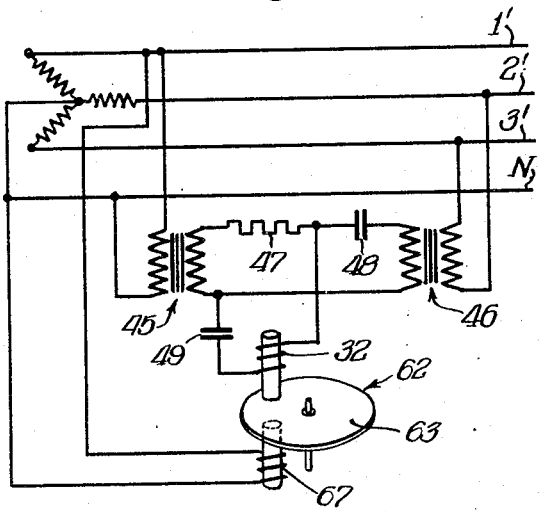

In yet another form of circuit (Figure 12) two voltage transformers 45 and 46 are connected back to back through a resistance 47 and a condenser 48 in series between two of their terminals. The voltage coil 32 of the relay 62 in series with a condenser 49 is connected in the manner of a bridge connection from the junction between the resistance 47 and the condenser 48 to the loop connecting the other terminals of the back to back transformers 45 and 46. The primary of the transformer 46 is connected across the affected lines 2¹, 3¹ and the primary of transformer 45 across the line 1¹ and neutral N. Under normal conditions, by a suitable choice of the circuit constants the voltages impressed on the voltage coil 32 by each transformer can be made to balance, which balance is upset by a phase disturbance acting upon the transformer 46.

We claim:

1. In a system for controlling from a control station operations at a remote station, in combination, a polyphase alternating current circuit interconnecting said stations, means at said control station for combining at the will of an operator an auxiliary voltage with a plurality of phase voltages of said circuit to produce resultant voltages out of phase with said phase voltages, and means at said remote station energized from said circuit and responsive to said resultant voltages.

2. In a system for controlling from a control station operations at a remote station, in combination, a polyphase alternating current circuit interconnecting said stations, means at said control station for adding or subtracting at the will of an operator an auxiliary voltage to or from a plurality of phase voltages of said circuit to produce resultant voltages out of phase with said phase voltages, and means at said remote station energized from said circuit and responsive to said resultant voltages.

3. In a system for controlling from a control station operations at a remote station, in combination, a three phase alternating current circuit interconnecting said stations, means at said control station for deriving a voltage from one phase of said circuit and applying the same to the other two phases so as to vary at the will of an operator the phase relation of the voltages of said two phases with respect to the voltage of said one phase, and means at said remote station energized from said circuit and responsive to the variation of said phase relation of the voltages of said two phases.

4. In a system for controlling from a control station operations at a remote station, in combination, a three phase alternating current circuit interconnecting said stations, means at said control station for deriving a voltage from one phase of said circuit and applying the same to the other two phases so as to advance or retard at the will of an operator the phase relation of the voltages of said two phases with respect to the voltage of said one phase, and means at said remote station energized from said circuit and responsive to the advance or retardation of said phase relation of the voltages of said two phases.

5. In a system for controlling from a control station operations at a remote station, in combination, a polyphase alternating current circuit interconnecting said stations, means at said control station for varying at the will of an operator the phase of a plurality of the phase voltages of said circuit, transformer means at said remote station having a plurality of primary winding means connected to be energized from different phases of said circuit and secondary winding means into which no voltage is induced as long as the phase of said plurality of phase voltages remains unchanged, a movable member, and a pair of windings operatively related to said movable member, one of said pair of windings being connected for energization to said secondary winding means and the other being connected for energization to said circuit.

6. In a system for controlling from a control station operations at a remote station, in combination, a polyphase alternating current circuit interconnecting said stations, means at said control station for varying at the will of an operator the phase of a plurality of the phase voltages of said circuit, a movable member at said remote station, and a pair of winding means operatively related to said movable member, one of said winding means being connected for energization to said circuit and the other being connected for energization between one phase of said circuit and a neutral point thereof to effect movement of said movable member only when the phase of said plurality of phase voltages is changed by the operator.

7. In a system for controlling from a control station operations at a remote station, in combination, a polyphase alternating current circuit interconnecting said stations, means at said control station for varying at the will of an operator the phase of a plurality of the phase voltages of said circuit, a movable member at said remote station, a pair of winding means operatively related to said movable member, one of said winding means being connected for energization to said circuit, and a balanced circuit including the other of said winding means connected for energization between said polyphase circuit and a neutral point thereof so that no current flows in said other winding means as long as the phase of said plurality of phase voltages remains unchanged.

GILBERT GILLIVER.
GEORGE FRANK TAGG.
GEORGE FREDERICK SHOTTER.